(12) United States Patent
Zollner et al.

(10) Patent No.: US 7,910,163 B2
(45) Date of Patent: Mar. 22, 2011

(54) METHOD FOR PRODUCING AN ADHESIVE STRIP COMPRISING A THERMALLY CROSS-LINKED ACRYLATE HOT-MELT ADHESIVE LAYER

(75) Inventors: Stephan Zollner, Buchholz/Nordheide (DE); Sven Hansen, Hamburg (DE); Kay Brandes, Kaltenkirchen-Moorkaten (DE); Jorg Speer, Wrist (DE)

(73) Assignee: tesa AG, Hamburg (DE)

( * ) Notice: Subject to any disclaimer, the term of this patent is extended or adjusted under 35 U.S.C. 154(b) by 6 days.

(21) Appl. No.: 11/573,029

(22) PCT Filed: Sep. 9, 2005

(86) PCT No.: PCT/EP2005/054506
§ 371 (c)(1),
(2), (4) Date: Oct. 29, 2008

(87) PCT Pub. No.: WO2006/027387
PCT Pub. Date: Mar. 16, 2006

(65) Prior Publication Data
US 2009/0048398 A1      Feb. 19, 2009

(30) Foreign Application Priority Data
Sep. 9, 2004   (DE) .................. 10 2004 044 086

(51) Int. Cl.
*B05D 5/10*     (2006.01)
(52) U.S. Cl. .................... 427/207.1; 430/207; 430/208; 522/126; 522/129
(58) Field of Classification Search ............... 427/207.1; 430/270.1, 280.1; 522/126, 129
See application file for complete search history.

(56) References Cited

U.S. PATENT DOCUMENTS

| | | | |
|---|---|---|---|
| 4,524,104 A | 6/1985 | Hagio et al. | |
| 5,095,046 A * | 3/1992 | Tse | 523/206 |
| 5,194,455 A | 3/1993 | Massow et al. | |
| 5,648,425 A | 7/1997 | Everaerts et al. | |
| 5,767,210 A | 6/1998 | Lecomte et al. | |
| 5,789,487 A | 8/1998 | Matyjaszewski et al. | |
| 5,811,500 A | 9/1998 | Dubois et al. | |
| 5,854,364 A | 12/1998 | Senninger et al. | |

(Continued)

FOREIGN PATENT DOCUMENTS

CN   1201809 A   12/1998

(Continued)

OTHER PUBLICATIONS

"Handbook of Pressure Sensitive Adhesive Technology" by Donatas Satas (van Nostrand, New York 1989, pp. 444-514).

(Continued)

*Primary Examiner* — Michael Kornakov
*Assistant Examiner* — Xiao Zhao
(74) *Attorney, Agent, or Firm* — Norris McLaughlin & Marcus, PA

(57) ABSTRACT

A process for producing an adhesive tape with single- or double-sided crosslinked pressure-sensitive acrylate hotmelt adhesive layer, wherein a crosslinker is added in the melt to a polyacrylate copolymer ("polyacrylate") based on acrylic and/or methacrylic esters, the polyacrylate with crosslinker is conveyed to a coating unit, where it is applied to a web-form layer and following application is homogeneously crosslinked, where the crosslinker is a thermal crosslinker and some of the acrylic and/or methacrylic esters contain primary hydroxyl groups and addition takes place preferably in an extruder.

13 Claims, 6 Drawing Sheets

U.S. PATENT DOCUMENTS

Figure 1:
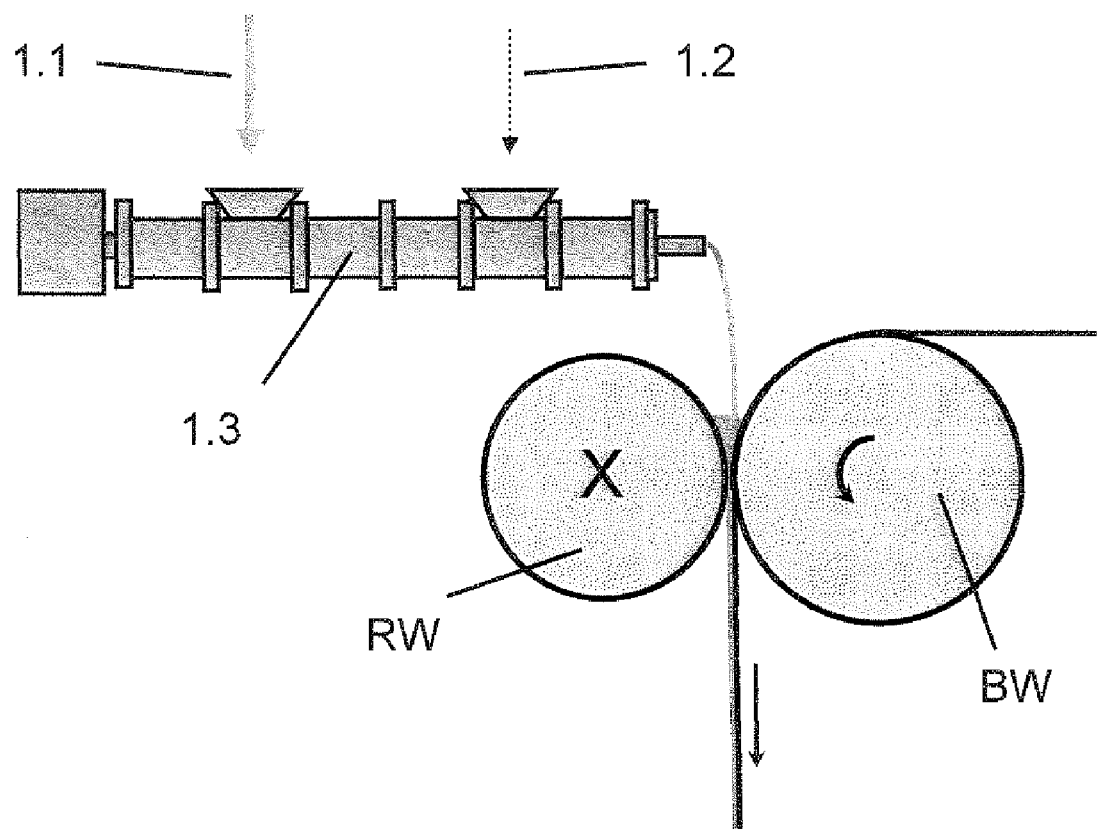

| | | | |
|---|---|---|---|
| 5,945,491 A | | 8/1999 | Matyjaszewski et al. |
| 5,997,456 A | * | 12/1999 | Butters et al. .............. 492/56 |
| 6,114,482 A | | 9/2000 | Senninger et al. |
| 6,677,000 B2 | | 1/2004 | Neuhaus-Steinmetz et al. |
| 6,753,079 B2 | | 6/2004 | Husemann et al. |
| 6,765,078 B2 | | 7/2004 | Husemann et al. |
| 6,875,506 B2 | | 4/2005 | Husemann et al. |
| 7,005,482 B2 | | 2/2006 | Guse et al. |
| 7,084,185 B2 | | 8/2006 | Husemann et al. |
| 2002/0079051 A1 | * | 6/2002 | McQuaid ................. 156/278 |
| 2003/0017332 A1 | | 1/2003 | Takizawa et al. |
| 2004/0092685 A1 | | 5/2004 | Husemann et al. |
| 2004/0263700 A1 | | 12/2004 | Hikichi et al. |
| 2005/0129936 A1 | | 6/2005 | Husemann et al. |
| 2006/0057366 A1 | | 3/2006 | Husemann et al. |
| 2006/0234047 A1 | | 10/2006 | Wenninger et al. |

FOREIGN PATENT DOCUMENTS

| | | |
|---|---|---|
| DE | 21 31 059 | 12/1972 |
| DE | 10029554 | 1/2002 |
| DE | 10029554 A1 | 1/2002 |
| DE | 10036901 | 4/2002 |
| DE | 10106630 | 8/2002 |
| DE | 10106630 A1 | 8/2002 |
| DE | 10163545 | 7/2003 |
| DE | 10145229 | 8/2004 |
| EP | 0 752 435 | 1/1997 |
| EP | 0 824 110 | 2/1998 |
| EP | 0 824 111 | 2/1998 |
| EP | 0 826 698 | 3/1998 |
| EP | 0 841 346 | 5/1998 |
| EP | 0 850 957 | 7/1998 |
| EP | 0882750 A2 | 12/1998 |
| EP | 1078966 | 2/2001 |
| EP | 1 127 907 | 8/2001 |
| JP | 2005017726 | 1/2005 |
| WO | WO 2004/050784 | 6/2004 |
| WO | WO 2005/059052 | 6/2005 |

OTHER PUBLICATIONS

T.G. Fox, Bull. Am. Phys. Soc. 1 (1956) 123.

* cited by examiner

METHOD FOR PRODUCING AN ADHESIVE STRIP COMPRISING A THERMALLY CROSS-LINKED ACRYLATE HOT-MELT ADHESIVE LAYER

This is a 371 of PCT/EP2005/054506 filed 9 Sep. 2005 (international filing date).

The invention relates to polyacrylates crosslinked by thermal treatment, to a process for preparing them and to their use.

BACKGROUND OF THE INVENTION

The technological operation of preparing pressure-sensitive adhesives (PSAs) is subject to continual ongoing development. In the industry, hotmelt processes with solventless coating technology are of growing importance in the preparation of PSAs. This development is being pressed further by ever more stringent environmental regulations and increasing prices for solvents. Consequently there is a desire to eliminate solvents as far as possible from the manufacturing operation for PSA tapes. The introduction of the hotmelt technology is imposing growing requirements on the adhesives. Acrylate PSAs in particular are a subject of very intensive investigation aimed at improvements. For high-level industrial applications, polyacrylates are preferred on account of their transparency and weathering stability. As well as these advantages, however, the acrylate PSAs must also meet stringent requirements in respect of shear strength. This is achieved by means of polyacrylates of high molecular weight and high polarity, with subsequent efficient crosslinking. Efficient crosslinking is obtained most easily by means of metal chelates, which at elevated temperatures react with carboxylic acid functions and so crosslink the acrylate PSA. This method is state of the art for solventborne PSAs.

For hotmelt operations preference is given to electron beam curing (EB curing or EBC) since it enables even fairly thick films to be crosslinked. Electron beam curing requires no thermal energy, and crosslinking takes place in a relatively short time.

The first EB-curing polyacrylate hotmelts were described in DE 21 31 059 A1. Further EB-curing hotmelts were developed in JP 05017726. U.S. Pat. No. 5,194,455 described the addition of N-tert-butylacrylamide monomer in order to force forward the EB curing.

A general disadvantage of EBC is the backing damage. The electron beams penetrate not only the adhesive but also the backing material or the release paper. This results in damage, which is manifested in instances of discoloration or in high unwind forces for the adhesive tape. The need is therefore for a hotmelt PSA crosslinking method which is both gentle to the backing and efficient.

For some time now UV-crosslinkable hotmelt PSAs have been available commercially under the trade name acResin®. These compositions, by virtue of their relatively low weight-average molecular weight ($M_w$ of about 200 000-300 000 g/mol), have very good coating qualities and can be crosslinked subsequently by means of UV irradiation. Disadvantages, however, are the inhomogeneity of crosslinking because of a dose profile, low efficiency in the case of resin-modified acrylate compositions, and a limitation of coat thickness to well below 100 µm, thereby ruling out their use for substantial areas of industrial adhesive tapes.

It is also proposed that reactive groups be protected and then liberated only after the coating operation, by means of a mechanism in the presence of crosslinkers such as polyfunctional isocyanates or epoxides, and hence that crosslinking be carried out. An example of this kind of crosslinking, carried out by means of UV initiation with the aid of a photoacid generator, is the application EP 1 127 907 A2. A disadvantage of this process is the liberation of the protective group: in this specific case, the liberation of gaseous isobutene.

Direct thermal crosslinking of acrylate hotmelt compositions containing NCO-reactive groups is described in EP 0 752 435 A1. The blocking-agent-free isocyanates used, particularly sterically hindered and dimerized isocyanates, require very drastic crosslinking conditions, and so a rational industrial implementation is not possible.

Under the conditions such as those which prevail when carrying out processing from the melt, the procedure EP 0 752 435 A1 describes leads to a rapid, relatively far-reaching crosslinking, so that processing of the composition is difficult, particularly with regard to the coating of backing materials. In particular it is not possible to obtain very homogeneous adhesive layers of the kind needed for numerous technical applications of adhesive tapes.

Also state of the art is the use of blocked isocyanates. A disadvantage of this concept is the liberation of blocking groups or fragments, which have an adverse effect on the technical adhesive properties. An example is U.S. Pat. No. 4,524,104. It describes acrylate hotmelt PSAs which can be crosslinked with blocked polyisocyanates together with cycloamidines or salts thereof as catalyst. With this system, one factor is that the catalyst required, but in particular the resultant HCN, phenol, caprolactam or the like, can severely impair the product's properties. Another factor affecting this concept is the drastic conditions required to liberate the reactive groups. No significant deployment of the product has yet been disclosed, and such deployment would anyway seem unattractive.

SUMMARY OF THE INVENTION

It is an object of the invention, therefore, to provide a process for the thermal crosslinking of acrylate hotmelt PSAs. In particular the process ought to be suitable for producing an adhesive tape which has been furnished at least on one side with a thermally crosslinked acrylate hotmelt PSA. Value is placed on the possibility of producing highly uniform and homogeneous layers.

The process of the invention ought very largely to avoid the release of chemical compounds which impair the technical adhesive properties.

This object is achieved by means of a process in which a solvent-free functionalized acrylate copolymer which, following metered addition of a thermally reactive crosslinker, has a processing time long enough for compounding, conveying and coating, can be coated onto a web-form layer of a further material, in particular onto a tapelike backing material or a layer of adhesive, preferably by means of a roll process, and after coating undergoes aftercrosslinking under mild conditions until a cohesion sufficient for PSA tapes is attained.

The invention accordingly provides a process for producing an adhesive tape which is coated at least on one side with a thermally crosslinked acrylate hotmelt pressure-sensitive adhesive. The process involves adding to a polyacrylate copolymer (referred to below simply as "polyacrylate") based on acrylic and/or methacrylic esters at least one thermal crosslinker in the melt, conveying the polyacrylate with crosslinker to a coating unit, and coating it there onto a web-form layer of a further material, in particular onto a tapelike backing material or a layer of adhesive, the crosslinking of the polyacrylate taking place on the web-form layer of the further material.

BRIEF DISCUSSION OF THE DRAWINGS

Figure 2:
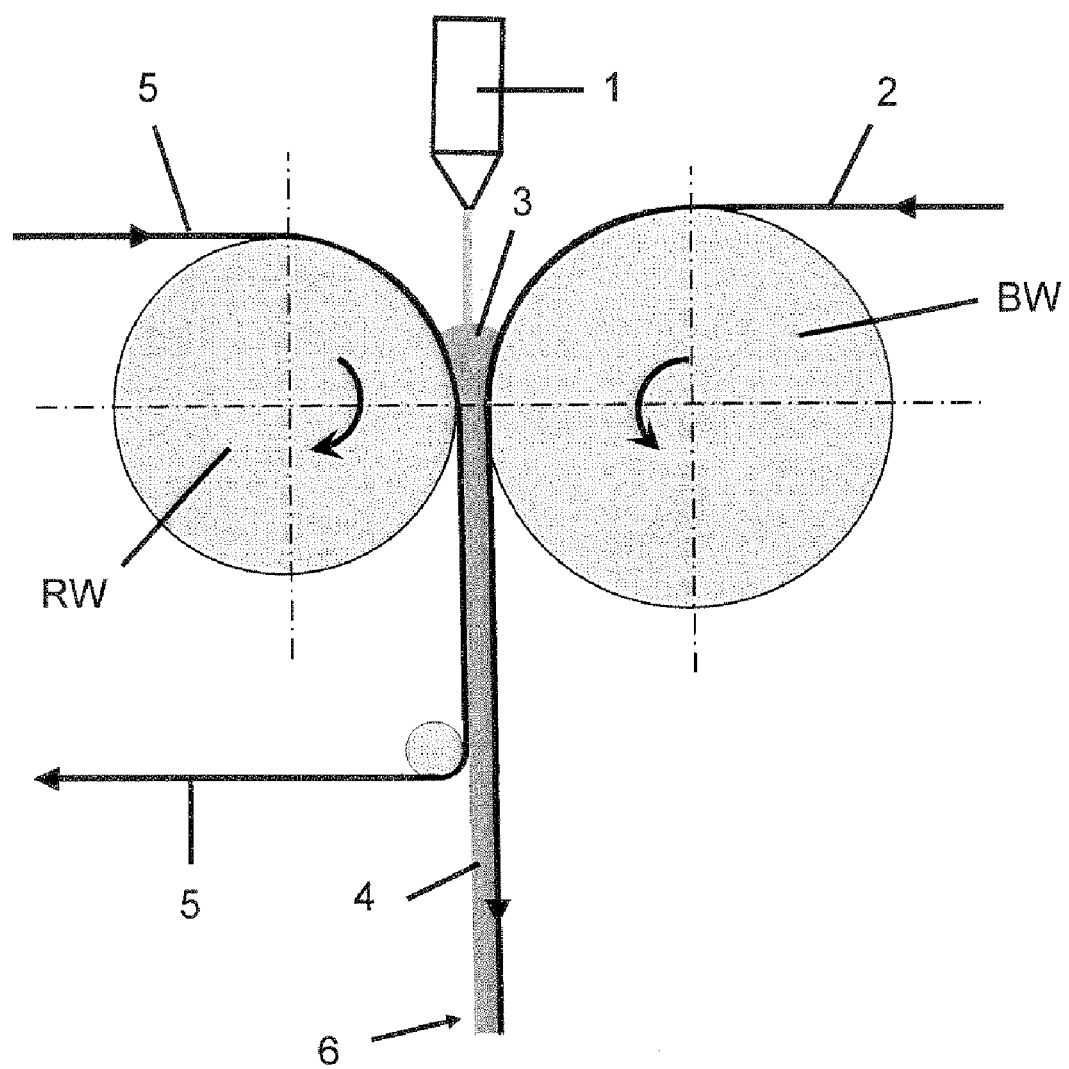
Figure 5:
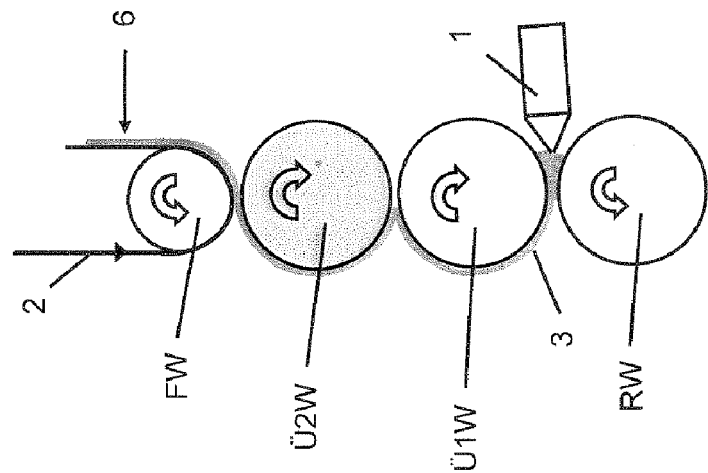
Figure 4:
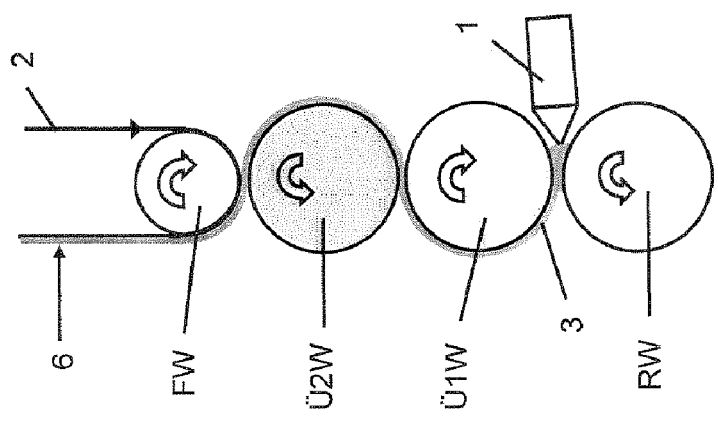
Figure 3:
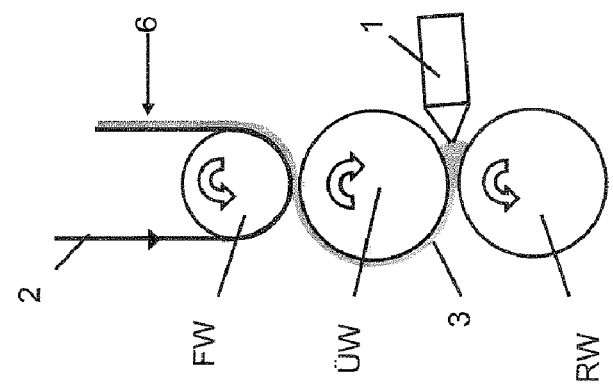
Figure 6:
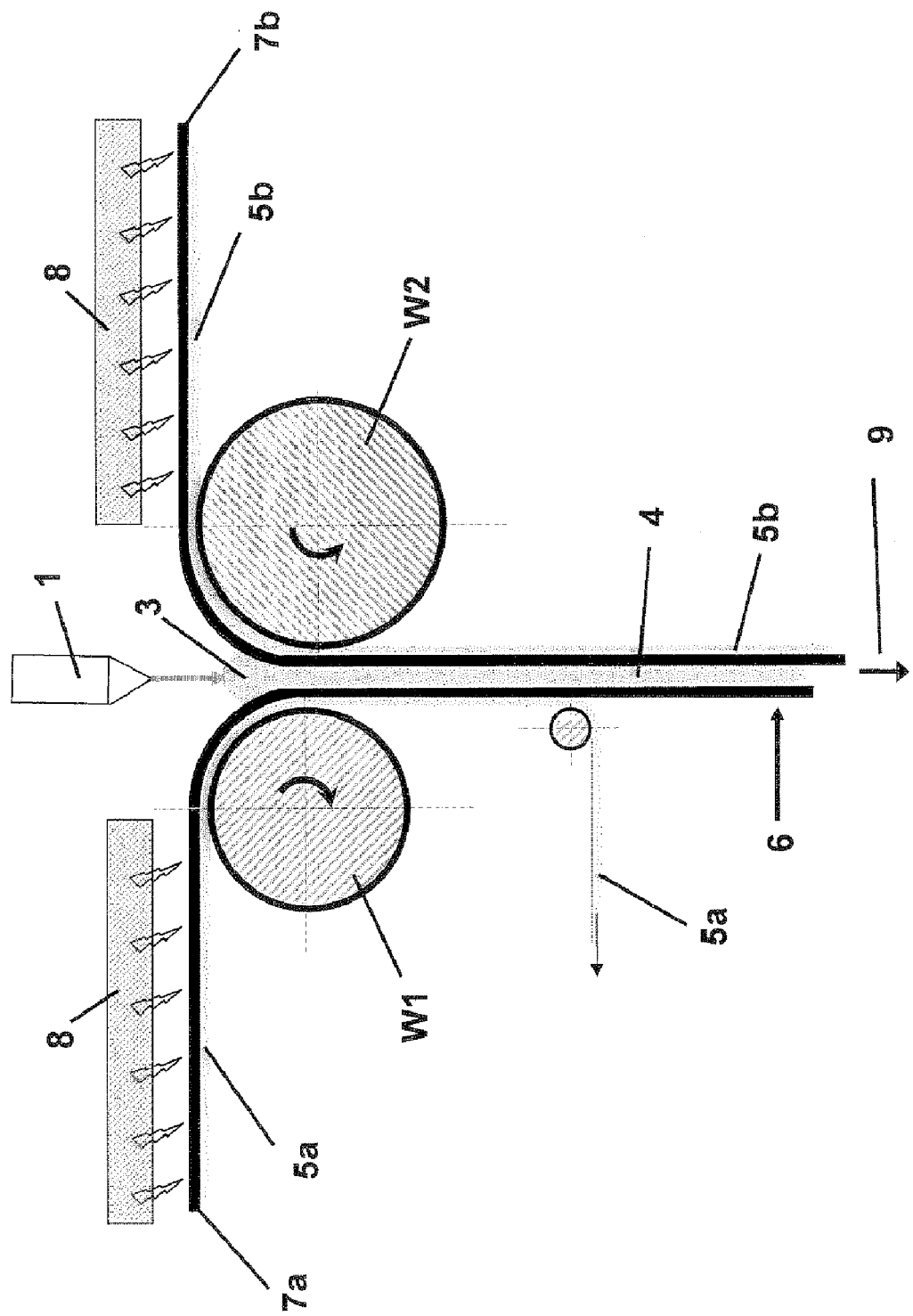
Figure 7:
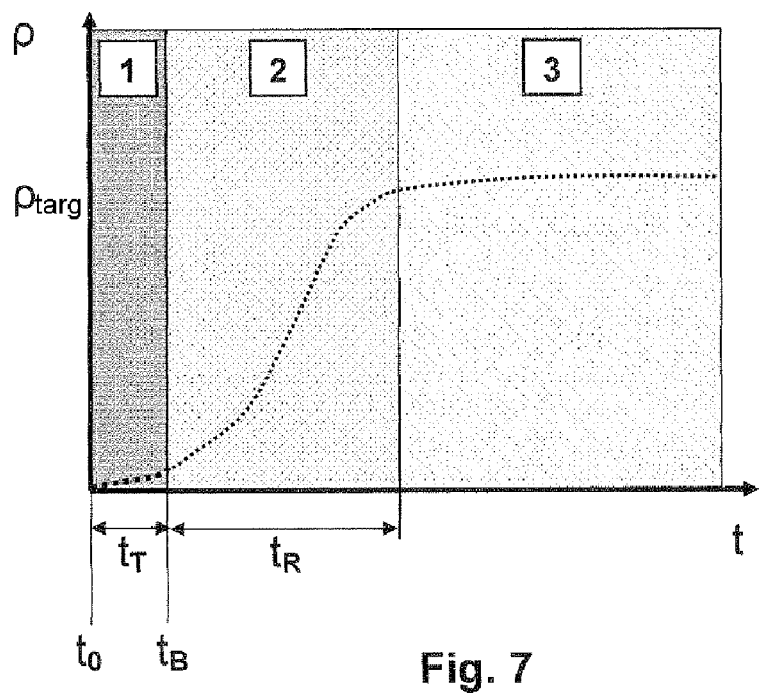
Figure 8:
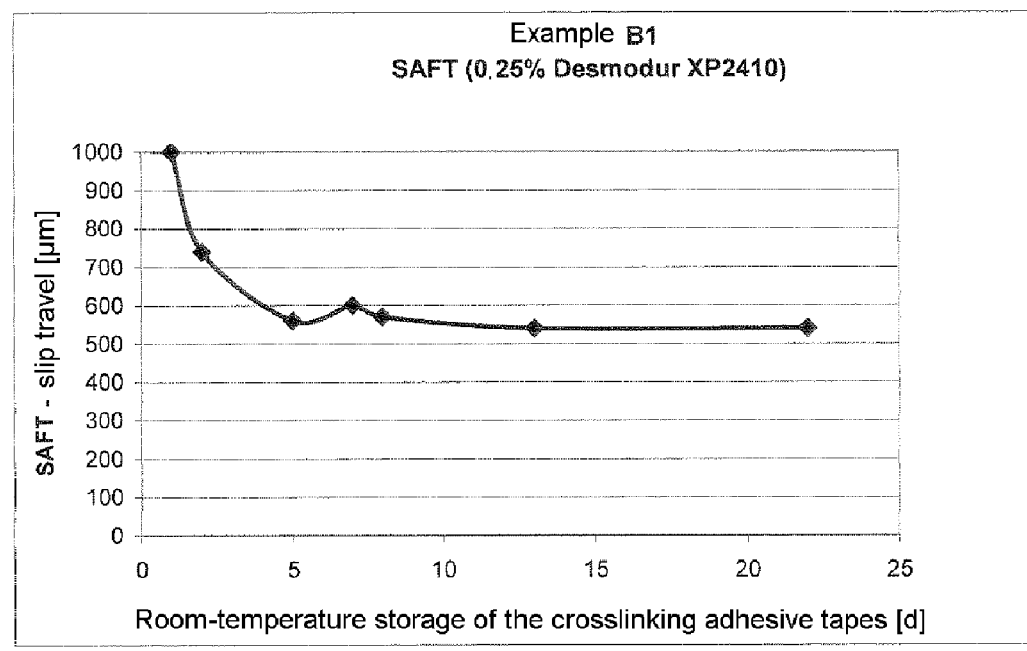
Figure 9:
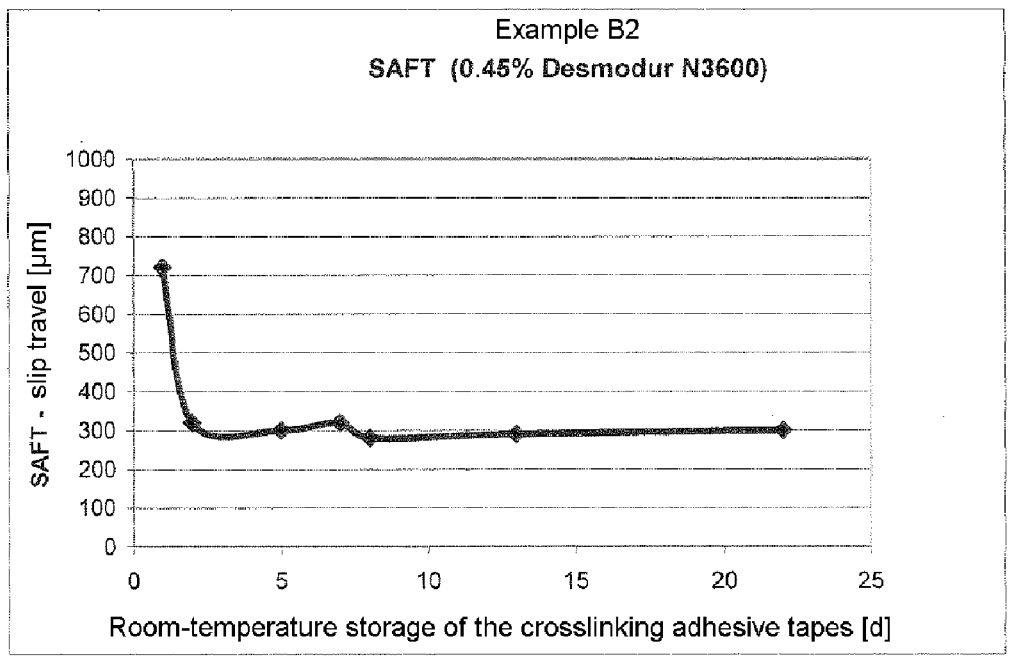
Figure 10:
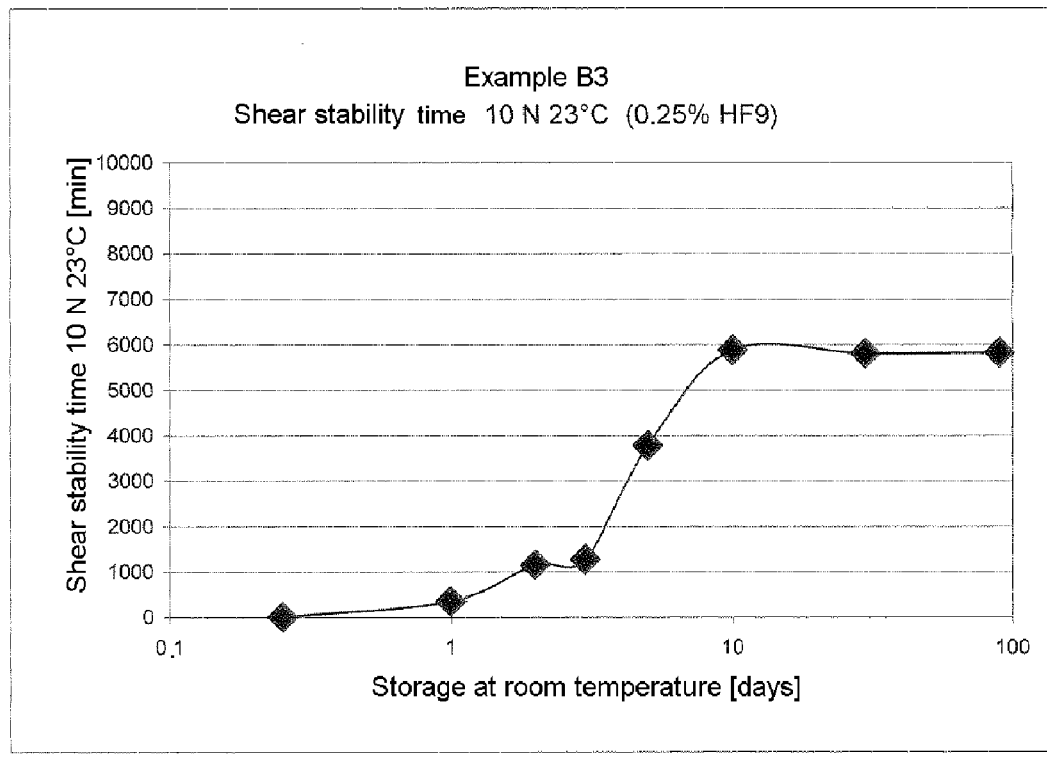

FIG. 1 is a diagrammatic representation of the process for producing the adhesive tape of the invention.
FIG. 2 is an enlarged view of a two-roll applicator.
FIG. 3. illustrates a three-roll applicator.
FIG. 4. illustrates a four-roll calender in co-/co-rotation.
FIG. 5. illustrates a four-roll calender in co-/counter-rotation.
FIG. 6. illustrates a two-roll applicator for multilayer products.
FIG. 7. is a graphical representation of degree of crosslinking against time.
FIG. 8. is a graphical representation of SAFT slip travel vs. time for Example B1.
FIG. 9. is a graphical representation of SAFT slip travel vs. time for Example B2.
FIG. 10. is a graphical representation of shear stability time vs. storage period for Example B3.

DETAILED DESCRIPTION

In accordance with the invention some of the acrylic and/or methacrylic esters contain primary hydroxyl groups. In preferred accordance with the invention the thermal crosslinker is added in an extruder.

Adhesive tapes for the purposes of the invention are to comprehend all single- or double-sidedly adhesive-coated sheetlike backing structures, thus including not only conventional tapes but also labels, sections, diecuts, two-dimensionally extended structures, and the like.

In one very advantageous embodiment the thermal crosslinker added is an isocyanate, preferably a trimerized isocyanate. With particular preference the trimerized isocyanates are aliphatic isocyanates and/or isocyanates deactivated with amines.

Suitable isocyanates are, in particular, trimerized derivatives of MDI [4,4-methylenedi(phenyl isocyanate)], HDI [hexamethylene diisocyanate, 1,6-hexylene diisocyanate] and/or IPDI [isophorone diisocyanate, 5-isocyanato-1-isocyanatomethyl-1,3,3-trimethylcyclohexane], examples being the Desmodur® grades N3600 and XP2410 (each from BAYER AG: aliphatic polyisocyanates, low-viscosity HDI trimers). Also very suitable is the surface-deactivated dispersion of micronized trimerized IPDI BUEJ 339®, now HF9® (BAYER AG).

Also suitable in principle for crosslinking, however, are other isocyanates such as Desmodur VL 50 (MDI-based polyisocyanates, Bayer AG), Basonat F200WD (aliphatic polyisocyanate, BASF AG), Basonat HW100 (water-emulsifiable polyfunctional isocyanate based on HDI, BASF AG), Basonat HA 300 (allophanate-modified polyisocyanate based on HDI isocyanurate, BASF) or Bayhydur VPLS2150/1 (hydrophilically modified IPDI, Bayer AG), this enumeration not being conclusive.

In the process a polyacrylate copolymer (referred to simply below as "polyacrylate") based on acrylic and/or methacrylic esters is the starting point, at least some of the acrylic and/or methacrylic esters containing primary hydroxyl groups. The fraction of the acrylic and/or methacrylic esters containing primary hydroxyl groups is in a preferred procedure up to 25% by weight, based on the polyacrylate. It may also be of advantage if the polyacrylate includes copolymerized acrylic acid.

For the process of the invention it is preferred in particular to use a polyacrylate which can be traced back to the following mixture of reactants, containing monomers of the following composition:

a1) acrylic and/or methacrylic esters of the following formula:

$$CH_2=C(R^I)(COOR^{II})$$

where $R^I$=H or $CH_3$ and $R^{II}$ is an alkyl chain having 1 to 20 Carbon atoms, with a fraction of 65-99% by weight, a2) acrylates and/or methacrylates whose alcohol component contains at least one primary hydroxyl group, and/or vinyl compounds which are copolymerizable with acrylates and contain at least one primary hydroxyl group, with a fraction of 1% to 20% by weight, a3) and, if the fractions of a1) and a2) do not add up to 100% by weight, olefinically unsaturated monomers containing functional groups, with a fraction of 0% to 15% by weight.

The monomers are preferably chosen such that the resulting polymers can be used at room temperature as PSAs, especially such that the resulting polymers possess PSA properties as set out in the "Handbook of Pressure Sensitive Adhesive Technology" by Donatas Satas (van Nostrand, N.Y. 1989, pages 444-514).

The monomers are preferably chosen such that the resulting polymers have a glass transition temperature, $T_G$, of $\leq 25°$ C., understood as a dynamic glass transition temperature for amorphous systems and as the melting temperature for semicrystalline systems, which can be determined by means of dynamic-mechanical analysis (DMA) at low frequencies.

In order to obtain a polymer glass transition temperature $T_g$ preferable for PSAs, viz. $T_g \leq 25°$ C., and in accordance with the above remarks, the monomers are very preferably selected, and the quantitative composition of the monomer mixture advantageously chosen, such as to result in the desired $T_g$ value for the polymer in accordance with the Fox equation (E1) (cf. T. G. Fox, Bull. Am. Phys. Soc. 1 (1956) 123).

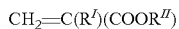

$$\frac{1}{T_g} = \sum_n \frac{w_n}{T_{g,n}} \tag{E1}$$

In this equation n represents the serial number of the monomers used, $w_n$ the mass fraction of the respective monomer n (% by weight) and $T_{g,n}$ the respective glass transition temperature of the homopolymer of the respective monomer n, in K.

Great preference is given to using for a1) acrylic or methacrylic monomers composed of acrylic and methacrylic esters having alkyl groups of 1 to 20 C atoms, preferably 4 to 9 C atoms. Specific examples, without wishing to be restricted by this recitation, are methacrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate, and their branched isomers, such as isobutyl acrylate, 2-ethylhexyl acrylate, 2-ethylhexyl methacrylate, isooctyl acrylate and isooctyl methacrylate, for example. Further classes of compound to be used for a1) are monofunctional acrylates and/or methacrylates of bridged cycloalkyl alcohols, composed of at least 6 C atoms. The cycloalkyl alcohols may also be substituted, for example by C-1-6 alkyl groups, halogen atoms or cyano groups. Specific examples are cyclohexyl methacrylates, isobornyl acrylate, isobornyl methacrylates and 3,5-dimethyladamantyl acrylate.

Great preference is given to using for a2) monomers which contain hydroxyl groups, very preferably primary hydroxyl groups. Examples of a2) are hydroxyethyl acrylate, hydroxyethyl methacrylate, hydroxypropyl acrylate, hydroxypropyl methacrylate, 6-hydroxyhexyl methacrylate, 4-hydroxystyrene and allyl alcohol, this enumeration not being conclusive.

Monomers for a3) are, for example, olefinically unsaturated monomers containing functional groups such as carboxylic acid groups, acid anhydride groups, phosphonic acid groups, amide or imide or amino groups, isocyanate groups, epoxy groups or thiol groups. Examples of a3) are acrylic acid or methacrylic acid, maleic anhydride, itaconic anhydride, itaconic acid, glyceridyl methacrylate, glyceryl methacrylate, vinylacetic acid, β-acryloyloxypropionic acid, trichloroacrylic acid, fumaric acid, crotonic acid, aconitic acid, acrylonitrile, dimethylacrylic acid, N,N-dialkyl-substituted amides, such as N,N-dimethylacrylamide, N,N-dimethylmethacrylamide, N-tert-butylacrylamide, N-vinylpyrrolidone, N-vinyllactam, dimethylaminoethyl methacrylate, dimethylaminoethyl acrylate, diethylaminoethyl methacrylate, diethylaminoethyl acrylate, N-methylolmethacrylamide, N-(buthoxymethyl)methacrylamide, N-methylolacrylamide, N-(ethoxymethyl)acrylamide and N-isopropylacrylamide, this enumeration not being conclusive.

Particularly suitable for the further processing of the invention are those polyacrylates which are prepared by bulk, solution or emulsion polymerization and may subsequently—particularly if they contain volatile constituents—be concentrated.

In one preferred procedure the polyacrylates have a weight-average molecular weight $M_w$ of at least 300 000 g/mol up to a maximum of 1 500 000 g/mol. The average molecular weight is determined by size exclusion chromatography (GPC) or matrix-assisted laser desorption/ionization mass spectrometry (MALDI-MS). The polyacrylates include at least one comonomer containing one or more primary hydroxyl groups. It may be necessary to carry out the polymerization in the presence of polymerization regulators such as thiols, halogen compounds and especially alcohols (isopropanol) in order to set the desired weight-average molecular weight $M_w$.

The polymerization time, depending on conversion rate and temperature, amounts to between 2 and 72 hours.

Also particularly suitable for the process of the invention are polyacrylates which have a narrow molecular weight distribution (polydispersity<4). These compositions, with a relatively low molecular weight, have particular shear strength after crosslinking. Since, in comparison to a normally distributed polyacrylate, a narrowly distributed polyacrylate requires a lower molecular weight for a given level of cohesion, the viscosity and operating temperatures are reduced. Thus a narrowly distributed polyacrylate allows a particularly long processing time.

Narrowly distributed polyacrylates can be prepared by means of anionic polymerization or by means of controlled radical polymerization methods, the latter being especially suitable. Examples are described in U.S. Pat. No. 6,765,078 B2 and DE 10036901 A1 or US 2004/0092685 A1. Atom transfer radical polymerization (ATRP) as well can be used advantageously for synthesizing narrowly distributed polyacrylates, using as initiator preferably monofunctional or difunctional secondary or tertiary halides and, to abstract the halide(s), complexes of Cu, Ni, Fe, Pd, Pt, Ru, Os, Rh, Co, Ir, Ag or Au (EP 0 824 111 A1; EP 826 698 A1; EP 824 110 A1; EP 841 346 A1; EP 850 957 A1). The various possibilities of ATRP are further described in publications U.S. Pat. No. 5,945,491 A, U.S. Pat. No. 5,854,364 A and U.S. Pat. No. 5,789,487 A.

Optionally it is possible to add the customary tackifying resins to the polyacrylate in the melt or even before concentration in solution. Tackifying resins for addition that can be used include, without exception, all of the tackifier resins that are known and are described in the literature. Representatives that may be mentioned include pinene resins, indene resins and rosins, their disproportionated, hydrogenated, polymerized and/or esterified derivatives and salts, the aliphatic and aromatic hydrocarbon resins, terpene resins and terpene-phenolic resins, and also $C_5$, $C_9$ and other hydrocarbon resins. Any desired combinations of these and further resins can be used in order to adjust the properties of the resultant adhesive in accordance with what is desired. With particular advantage it is possible to use any resins which are compatible with (soluble in) the corresponding polyacrylate; reference may be made in particular to all aliphatic, aromatic and alkylaromatic hydrocarbon resins, hydrocarbon resins based on single monomers, hydrogenated hydrocarbon resins, functional hydrocarbon resins, and natural resins. A preferred terpene-phenolic resin is for example Dertophene T 110, a preferred hydrogenated rosin derivative Foral 85.

Optionally it is also possible for pulverulent and granular fillers, dyes and pigments, including particularly those which are abrasive and provide reinforcement, such as chalks ($CaCO_3$), titanium dioxides, zinc oxides and carbon blacks, for example, even in high proportions, in other words from 1% to 50% by weight, based on the overall formula, to be metered outstandingly into the polyacrylate melt, incorporated homogeneously and coated on a 2-roll applicator. This is where the conventional processes often fail, owing to the resultant very high viscosity of the overall compound.

With particular preference various forms of chalk can be used as a filler, particular preference being given to using Mikrosöhl chalk (from Söhlde). At preferred proportions of up to 30% by weight the addition of filler causes virtually no change in the technical adhesive properties (shear strength at RT, instantaneous bond strength on steel and PE).

Additionally it is possible for fillers of low flammability, such as ammonium polyphosphate, and also electrically conductive fillers, such as conducting black, carbon fibers and/or silver-coated beads, and also ferromagnetic additives, such as iron(III) oxides, and also additives for producing foamed coats, such as blowing agents, solid glass beads, hollow glass beads, expandable microballoons, aging inhibitors, light stabilizers, and ozone protectants, for example, to be added or compounded in before or after the concentration of the polyacrylate.

An optional possibility is to add the customary plasticizers in concentrations of up to 5% by weight. Plasticizers which can be metered in include, for example, low molecular weight polyacrylates, phthalates, water-soluble plasticizers, plasticizer resins, phosphates or polyphosphates.

Optionally it is possible for the thermally crosslinkable acrylate hotmelt to be blended with other polymers. Polymers suitable for this purpose are those based on natural rubber, synthetic rubber, EVA, silicone rubber, acrylic rubber, polyvinyl ether.

In this context it proves useful to add these polymers in granulated or otherwise comminuted form to the acrylic hotmelt before the thermal crosslinker is added. The polymer blends are produced in an extruder, preferably in a multiscrew extruder, or in a planetary roll mixer. In order to stabilize the thermally crosslinked acrylate hotmelts, and especially the polymer blends of thermally crosslinked acrylate hotmelt and other polymers, it can be sensible to irradiate the shaped material with low-dose electron beams. For this purpose it is possible, optionally, to add crosslinking promoters such as di-, tri- or multifunctional acrylate or polyester or urethane acrylate to the polyacrylate.

In the process of the invention for preparing crosslinked polyacrylates, the reactive crosslinkers are added under precise temperature control and time control to the polyacrylate that is to be crosslinked. The composition is conveyed to a coating unit and transferred to a backing, preferably by means of 2-roll, multiroll or nozzle coating.

The time after metered addition of the crosslinking system in the compounding assembly through to the shaping application of the system to a backing is referred to as the processing time. Within this time the PSA, which is now undergoing crosslinking, can be coated out in gel-free form with a visually good coating pattern. Crosslinking then takes place primarily after coating on the web under mild conditions which are harmful neither to backing or to liner.

The addition of the thermal crosslinker to the polyacrylate takes place in the melt, preferably under precise temperature and time control.

The addition and incorporation of the thermally reactive crosslinking system into the polyacrylate matrix take place, with particular advantage inventively, in continuously operating compounding assemblies. These assemblies are designed, in accordance with the invention, so that, with thorough mixing in conjunction with a low input of shearing energy, the residence time of the composition after the metering of the crosslinking system is short. The compounding assemblies are preferably twin-screw extruders and/or planetary roller extruders. It is especially advantageous here if the spindles of the extruder are heatable and/or coolable.

The crosslinkers are added at one or more locations in the assemblies, preferably in unpressurized zones. It is also favorable if the thermally reactive crosslinker substances are added in finely divided form to the polyacrylate, in the form for example of an aerosol, in fine droplets, or diluted in a suitable diluent such as a polymer-compatible plasticizer.

A preferred procedure is to use the thermal crosslinker, in particular the trimerized isocyanate, at 0.1% to 5% by weight, in particular 0.2% to 1% by weight, based on the polyacrylate.

In one development of the process of the invention the temperature of the polyacrylate when the thermal crosslinker is added is between 60° C. and 120° C., with particular preference between 70° C. and 100° C.

The residual monomer content in the polyacrylate when the thermal crosslinker is added is advantageously not more than 1% by weight, in particular not more than 0.3% by weight, based on the polyacrylate. With further advantage the residual solvent content of the polyacrylate after concentration and when the thermal crosslinker is added is not more than 1% by weight, in particular not more than 0.3% by weight, based on the polyacrylate.

The polyacrylate with crosslinker is conveyed to a coating unit, more preferably with an extruder, more preferably still with the compounding extruder in which the crosslinker has already been added and in which, where appropriate, the concentration of the polyacrylate has already taken place; in this respect cf. the diagrammatic representation in FIG. 1 (where 1.1 denotes polyacrylate introduction, 1.2 denotes crosslinker addition, 1.3 denotes extruder, RW denotes doctor roll, and BW denotes coating roll). It is therefore advantageous in accordance with the invention to realize the concentration of polyacrylate, the addition and compounding of crosslinker, and the transport of the composition in a single extruder or in extruder lines, so that, starting from the solvent-containing base polymer, the outlet of the extruder or extruder line produces the ready-compounded, largely solvent-free, resin-blended, filler-blended and crosslinker-blended self-adhesive composition, without additional production steps, and this composition is then supplied to the coating operation.

In the coating operation, the polyacrylate composition is transferred to a backing material, preferably by means of two-roll, multiroll or nozzle coating. Coating in this context is the shaping of the very largely solvent-free adhesive, blended with crosslinker, into thin layers and its application to a web-form backing material. The processing time is generally 3-30 minutes, preferably 5-20 minutes, more preferably 5-10 minutes. Low-viscosity systems are coated preferably using nozzles, their higher-viscosity counterparts using multiroll units.

As backing material, for adhesive tapes for example, it is possible in this context to use the materials that are customary and familiar to the skilled worker, such as films (polyester, PET, PE, PP, BOPP, PVC), nonwovens, woven fabrics and woven films and/or, where appropriate, release paper. This recitation is not intended to be conclusive.

The backing may be a permanent backing (particularly for the production of backing-based adhesive tapes) or a temporary backing (particularly for the production of adhesive transfer tapes).

The coating operation of the self-adhesive compositions takes place preferably with roll applicator units, also called coating calenders. The coating calenders may consist advantageously of two, three, four or more rolls.

Advantageously at least one of the rolls is provided with an anti-adhesive roll surface, and this is so preferably for all of the rolls that come into contact with the polyacrylate. In a favorable procedure it is possible for all of the rolls of the calender to have been given an anti-adhesive finish.

As an anti-adhesive roll surface it is particularly preferred to use a steel-ceramic-silicone composite. Roll surfaces of this kind are resistant to thermal and mechanical loads.

Described below are various inventively suitable embodiments. The specification of the coating methods is not, however, intended to restrict the invention unnecessarily.

Version A: Two-Roll Applicator (FIG. 2)

A two-roll calender (cf. FIG. 2) is especially suitable for producing adhesive tapes with layer thicknesses between 5 μm and 5000 μm at low and moderate coating speeds of 1 m/min to 50 m/min.

The two rolls (W1) and (W2) are arranged such that they form a nip, into which the self-adhesive composition (3) is introduced by means for example of a distributor nozzle (1). The first roll (BW) ["coating roll"] guides the backing (2) onto which the self-adhesive composition (3) is to be coated. The second roll (RW) ["doctor roll"] leads an anti-adhesively finished auxiliary backing (5) and presses by means of the auxiliary backing onto the adhesive, so that the latter is deposited as a layer (4) on the backing (2). At position (6) the anti-adhesively finished auxiliary backing (5) is taken off again from the layer (4) of self-adhesive composition, and the adhesive tape (6), consisting of the layer (4) of adhesive on the backing (2), is led out of the coating unit.

At layer thicknesses of up to about 500 μm it is possible to do without the anti-adhesively finished auxiliary backing (5), so that the adhesive (3) has direct contact with the doctor roll (RW). Materials which can be used for the backing (2) include virtually all of the backing materials that are known in adhesive tape manufacture: for example, thermoplastic films of PE, PP or PET, papers, woven fabrics, and also release films and other anti-adhesive finished backing types. The surface temperatures of the rolls are set at between 25° C. and 200° C., preferably between 60° C. and 150° C. and more preferably between 80° C. and 120° C. Suitable surfaces for the two calender rolls used are the materials familiar to the skilled workers, such as steel, chromed steel, stainless steel, plastics, silicones, ceramics, and conceivable combinations of the stated materials.

If layer thicknesses of up to about 500 μm are to be coated and no auxiliary backing (5) is used, an anti-adhesively finished roll surface to the doctor roll (RW) is advantageous. A roll surface of this kind may consist, for example, of the material called PALLAS SK-B-012/5 from PALLAS OBERFLÄCHENTECHNIK GMBH, Germany or of the material called AST 9984-B from ADVANCED SURFACE TECHNOLOGIES, Germany. These surfaces comprise metal-ceramic-silicone composites, which are notable for good anti-adhesive properties in conjunction with a high service life under the chosen operating conditions.

Version B: Three-Roll Calender (FIG. 3)

With great advantage it is possible to use multiroll systems (in particular having three rolls) for the coating operation. FIG. 3 shows the principle of the three-roll applicator: a distributor nozzle (1) applies the adhesive (3), again, into a nip formed by a first roll (ÜW) ["transfer roll"] and a doctor roll (RW). The self-adhesive composition is deposited temporarily on the transfer roll (ÜW) and led from that roll to a third roll (FW) ["guide roll"], which brings the backing material (2) up to the adhesive layer. In the course of passage through the nip formed between the transfer roll (ÜW) and the guide roll (BW), the adhesive layer (4) is deposited from the surface of the transfer roll (ÜW) onto the backing material (2) and led in the form of adhesive tape (6) out of the coating unit.

The directions of rotation of the individual rolls are shown in the figure by the respective arrow direction.

Completely surprising to the skilled worker is the fact that the resin-blended, solvent-free, polyacrylate-based self-adhesive compositions, some of which have a strong inherent tack, can be coated using three-roll calenders, and amazingly can be coated even onto anti-adhesively finished backing materials such as release papers and release films. What would have been expected, instead, was that the adhesive, after leaving the distributor nozzle, would remain at least partly on the doctor roll (RW) and would not undergo transfer in the form of a homogeneous film layer of self-adhesive composition onto the transfer roll (ÜW). Moreover, it would not have been supposed that the self-adhesive composition shapingly applied to transfer roll (ÜW) would be able to be transferred with a largely optically homogeneous coating pattern to the backing material. Instead the expectation would have been that the film layer of adhesive would remain on the transfer roll (ÜW) or would transfer incompletely to the backing. Amazingly, instead, adhesive tapes with a good coating pattern, i.e., with a largely optically homogeneous surface, are produced.

Particularly good results are achieved with the use of calender rolls which have been finished with anti-adhesive surfaces; this applies with particular advantage to the transfer roll ÜW. These surfaces contribute in a particularly advantageous way to the success of the coating method, since anti-adhesive roll surfaces allow the polyacrylate composition to be transferred even to anti-adhesive coating surfaces. Different kinds of anti-adhesive surface coatings can be used for the calender rolls. Those which have proven particularly suitable here include, for example, the aforementioned metal-ceramic-silicone composites PALLAS SK-B-012/5 from PALLAS OBERFLÄCHENTECHNIK GMBH, Germany, and AST 9984-B from ADVANCED SURFACE TECHNOLOGIES, Germany.

On account of the high pressures in the roll nips, and where appropriate the differential speeds of the rolls relative to one another, pure silicone coatings or TEFLON® coatings appear to be of only limited suitability, since either they are mechanically destroyed and/or they lose their anti-adhesive properties over time.

With the three-roll coating calender described it is possible in particular to coat self-adhesive compositions with layer thicknesses between 5 μm and 300 μm onto backing materials, preferably with layer thicknesses between 20 μm and 250 μm, and more preferably with layer thicknesses between 50 μm and 200 μm.

The coating speed, which for the present purposes is the peripheral speed of the guide roll (FW), which therefore corresponds to the web speed of the backing material, can be set advantageously between 1 m/min and 400 m/min, preferably between 10 m/min and 300 m/min. The peripheral speed of the transfer roll (ÜW) can be set advantageously at 5% to 110% of the web speed, preferably at 50% to 110% of the web speed, and more preferably at 80% to 110% of the web speed. The peripheral speed of the doctor roll (RW) can be set advantageously at 0 m/min ("static pressing") up to 5% of the web speed.

Besides the peripheral speeds of the rolls, the roll nips also require setting. What are meant here are the distances between the doctor roll (RW) and the transfer roll (W2) and also between the transfer roll (W1) and the guide roll (FW).

The roll nips are preferably set such that the layer thicknesses described above are attained at the above-described roll surface speeds.

The roll surface temperatures are set advantageously at 40° C. to 160° C., preferably at 60° C. to 140° C., and more preferably at 80° C. to 120° C. All three rolls of the calender can be set at the same temperature, although it is also possible to set different surface temperatures for each roll. The roll surface temperatures should be adapted in each case to the nature of the roll surfaces, the adhesive that is to be applied by coating, and the backings that are to be coated.

There follows by way of example an overview of suitable roll surfaces which have proven particularly advantageous:

Doctor Roll (RW)
  SK-B-012/5 from PALLAS OBERFLÄCHENTECHNIK GmbH, Germany
  AST 9984-B from ADVANCED SURFACE TECHNOLOGIES, Germany
  chromed steel
  steel, surface roughness RZ 10 to RZ 35
  TEFLON®
  silicone
Transfer Roll (ÜW)
  SK-B-012/5 from PALLAS OBERFLÄCHENTECHNIK GmbH, Germany
  AST 9984-B from ADVANCED SURFACE TECHNOLOGIES, Germany
Guide Roll (FW)
  silicone rubber, 60 to 80 shore Version C: Four-Roll Calender (Co-/Co-Rotation) (Cf. FIG. 4).

FIG. 4 shows a further advantageous coating unit. Starting from the basis of the unit described above, a second transfer roll (Ü2W) is provided between the first transfer roll (Ü1W) and the guide roll (FW). In the nip between the first transfer roll (Ü1W) and the second transfer roll (Ü2W) the adhesive layer (4) is taken from the first transfer roll (Ü1W) and applied to the second transfer roll (Ü2W). From this second transfer roll the adhesive layer (4) is again transferred to the backing material, in the same way as already described for the three-roll applicator.

The rolls are connected in co-/co-rotation; compare the rotational directions of the individual rolls, as indicated by arrows in FIG. 4.

With the four-roll coating calender (co-/co-rotating operation) described it is possible—as with the three-roll method described as version B—with great advantage to coat self-adhesive compositions with layer thicknesses between 5 μm and 300 μm onto backing materials, preferably with layer thicknesses between 20 μm and 250 μm, and more preferably with layer thicknesses between 50 μm and 200 μm. This calender configuration can be chosen with particular preference especially when the adhesives to be coated are of high viscosity or when the finished adhesive tape is required to have a particularly smooth surface structure.

The coating speed (again in the sense of the peripheral speed of the guide roll (FW) and the web speed) can be set advantageously between 0.5 m/min and 400 m/min, preferably between 10 m/min and 300 m/min. The peripheral speed of the doctor roll (RW) can be set here again advantageously at 0 m/min up to 5% of the web speed.

The peripheral speed of the first transfer roll (Ü1W) can be set preferably at 5% to 80% of the web speed, more preferably at 10% to 50% of the web speed, and more preferably at 20% to 30% of the web speed.

The peripheral speed of the second transfer roll (Ü2W) can be set preferably at 10% to 110% of the web speed, more preferably at 50% to 110% of the web speed, and with particular preference at 80% to 110% of the web speed.

The roll nips (in each case between the rolls AW and Ü1W, Ü1W and Ü2W, and Ü2W and FW) are again set preferably such that the layer thicknesses described above are achieved at the above-described roll surface speeds. The roll surface temperatures are advantageously set at 40° C. to 160° C., preferably at 60° C. to 140° C., and more preferably at 80° C. to 120° C. All four rolls of the calender may be set to the same temperature, although it is also possible to set different surface temperatures for each roll. The roll surface temperatures are in each case to be adapted to the nature of the roll surfaces, the adhesive that is to be applied by coating, and the backings that are to be coated.

The advantages of anti-adhesive roll surfaces arise in a way which is similar to that in method version B.

Here again there follows an overview of the roll surfaces which can be used for a particular advantage in accordance with the invention, without any intention that the invention should be restricted unnecessarily as a result of this specification:

Doctor Roll (RW)
  SK-B-012/5 from PALLAS OBERFLÄCHENTECHNIK GmbH, Germany
  AST 9984-B from ADVANCED SURFACE TECHNOLOGIES, Germany
  chromed steel
  steel, surface roughness RZ 10 to RZ 35
  TEFLON®
  silicone
First Transfer Roll (Ü1W)
  AST 9984-B from ADVANCED SURFACE TECHNOLOGIES, Germany
Second Transfer Roll (Ü2W)
  SK-B-012/5 from PALLAS OBERFLÄCHENTECHNIK GmbH, Germany Guide Roll (FW)
  silicone rubber, 60 to 80 shore Method D: Four-Roll Calender (Co-/Counter-Rotation (cf. FIG. 5)

FIG. 5 shows a four-roll calender which can likewise be used with advantage but which is operated in co-/counter-rotation. In terms of operation, version D differs from version C in that the layer of adhesive is not pulled through between the transfer rolls Ü1W and Ü2W and in the course of that procedure transferred from the first transfer roll Ü1W to the second transfer roll Ü2G, but instead, as a result of the first and second transfer rolls having the same direction of rotation, the adhesive, as it undergoes transfer from the first to the second transfer roll, experiences a change in direction (counter-rotation); cf. in this context the depiction in FIG. 5 and in particular the roll rotational directions shown therein.

With the four-roll coating calender described here it is possible outstandingly, as with the four-roll calendar configuration described in method C, to carry out coating of self-adhesive compositions. The notable feature of this calender configuration is that the second transfer roll, Ü2W, exhibits a direction of rotation, at the nip between these two rolls, which is opposite that of the first transfer roll, Ü1W. As a result it is possible to produce adhesive tapes with high layer thicknesses of between 100 μm and 1000 μm, preferably with layer thicknesses of between 200 μm and 800 μm, and more preferably with layer thicknesses of between 300 μm and 600 μm.

The coating speed, which again is the peripheral speed of the guide roll FW, can be set advantageously at between 0.5 m/min and 400 m/min, preferably between 10 m/min and 300 m/min.

The peripheral speed of the doctor roll RW can be set advantageously at 0 m/min up to 5% of the web speed.

The peripheral speed of the first transfer roll, Ü1W, can be set advantageously at 5% to 130% of the web speed, preferably at 10% to 50% of the web speed, and more preferably at 20% to 30% of the web speed.

The peripheral speed of the second transfer roll, Ü2W, can be set advantageously at 10% to 110% of the web speed, preferably at 50% to 110% of the web speed, and more preferably at 80% to 110% of the web speed.

With this version as well the roll nips are set such that the layer thicknesses described above are achieved at the above-described roll surface speeds. The roll surface temperatures are set favorably in accordance with the invention at 40° C. to 160° C., preferably at 60° C. to 140° C., and more preferably at 80° C. to 120° C. All four rolls of the calender may be set to the same temperature, although it is also possible to set different surface temperatures for each roll. The roll surface temperatures are to be adapted in each case to the nature of the roll surfaces, the adhesive to be applied by coating, and the backings that are to be coated.

For this version D, likewise, an overview of the roll surfaces employed is given, without any intention that the inventive subject matter should be unnecessarily restricted:

Doctor Roll RW
  SK-B-012/5 from PALLAS OBERFLÄCHENTECHNIK GmbH, Germany
  AST 9984-B from ADVANCED SURFACE TECHNOLOGIES, Germany
  chromed steel
  steel, surface roughness RZ 10 to RZ 35
  TEFLON®
  silicone
Transfer Roll Ü1W
  AST 9984-B from ADVANCED SURFACE TECHNOLOGIES, Germany Transfer Roll Ü2W
  SK-B-012/5 from PALLAS OBERFLÄCHENTECHNIK GmbH, Germany
Guide Roll FW
  silicone rubber, 60 to 80 shore Version E: Two-Roll Method for Multilayer Products (FIG. 6)

FIG. 6 shows a procedure which is used with particular advantage for producing three-layer adhesive tapes, in which the thermally crosslinking acrylate composition forms the backing of the adhesive tape. The three-layer adhesive-polyacrylate backing-adhesive system is constructed preferably by way of a two-roll unit. By means of a distributor nozzle (1) or other suitable unit, the viscoelastic composition (3) which forms the eventual backing material and which has been compounded with the crosslinker and, where appropriate, with fillers, is supplied to the roll nip, where it is introduced between the two adhesive layers (6a, 6b), which have been subjected beforehand to a pretreatment, in particular a corona treatment (8). The adhesives, coated in particular onto antiadhesively finished auxiliary backings (7a, 7b), are introduced by the rolls W1 and W2 into the apparatus, in such a way that the adhesive sides face one another. The shaping of the viscoelastic composition into a viscoelastic film layer takes place between the calender rolls W1 and W2 in the roll nip, this procedure being accompanied by the coating application of the two supplied self-adhesive compositions (6a, 6b). The pretreatment of the adhesives, in particular within a corona station (8), serves for better anchoring of the adhesives on the shaped viscoelastic backing layer. This treatment produces active OH groups on the surface of the self-adhesive compositions, which after the three-layer assembly has been produced lead to improved chemical attachment to the viscoelastic backing layer.

The breadth of the roll nip and the pressure of the rolls determine the layer thickness of the backing in this case.

The method described above is especially suitable for producing viscoelastic three-layer constructions with layer thicknesses of between 100 μm and 10 000 μm, preferably between 300 μm and 5000 μm, with production speeds of between 0.5 m/min and 100 m/min.

The surface temperatures of the rolls, as a function of the viscoelastic compositions and anti-adhesive backing materials used, are set preferably at between 25° C. and 200° C., more preferably between 60° C. and 150° C., and with particular preference between 80° C. and 120° C. Suitable surfaces for the two calender rolls used are all of the materials familiar to the skilled worked, such as steel, chromed steel, stainless steel, plastics, silicones, ceramics, and combinations of the stated materials.

Amazingly, and surprisingly for the skilled worker, is the fact that the bead of composition rotating within the roll nip does not become mixed with the supplied self-adhesive compositions. The expectation would have been that the self-adhesive composition would undergo at least partial detachment from the anti-adhesively finished backing, and would mix with the rotating bead of composition.

Directly after the coating operation by means of roll application—preferably by one of the methods specified above—or by means of extrusion die, the adhesive has only a low level of incipient crosslinking, but is not yet sufficiently crosslinked. The crosslinking reaction takes place advantageously on the backing.

The reaction, in particular with isocyanates, proceeds preferably without catalysis. The crosslinking reaction proceeds to completion, even without supply of heat, under standard conditions (room temperature). Generally speaking, after a storage period of up to 14 days, in particular of four to ten days, the crosslinking reaction with the multifunctionalized isocyanate is very largely at an end, and the ultimate cohesion of the composition is attained.

As a result of the crosslinking with isocyanates, urethane groups are formed which link the polymer chains. This linkage raises the cohesion of the adhesive and hence also its shear strength. These groups are known to be very stable. This allows self-adhesive tapes with great aging stability and heat resistance.

In the case of functionalized acrylate copolymers which contain no copolymerized acrylic acid, the reaction proceeds preferably with aromatic and/or aliphatic isocyanates at slightly elevated temperatures.

In the case of functionalized acrylate copolymers which contain copolymerized acrylic acid, the reaction rate is faster. Here an operationally stable process is accomplished preferably with the slower aliphatic isocyanates or surface-deactivated isocyanate emulsions.

The physical properties of the end product, particularly its viscosity, bond strength and contact adhesion (tack), can be influenced by the degree of crosslinking, so that through a suitable choice of reaction conditions it is possible to optimize the end product. A variety of factors determine the operating window of this process. The most important influencing variables are operating temperature and coating temperature, residence time in compounding extruder and coating assembly, type of crosslinker (deactivated, aliphatic, aromatic), crosslinker concentration, fraction of hydroxyl groups in the polymer, fraction of copolymerized acid groups in the polymer, and average molecular weight of the polyacrylate.

Described below are a number of relations in association with the production of the self-adhesive composition of the invention, these relations optimizing the production process but not being restrictive of the concept of the invention:

For a given concentration of crosslinker, an increase in the operating temperature leads to a reduced viscosity, which enhances the coatability of the composition but reduces the processing time. An increase in processing time is obtained by lowering the crosslinker concentration, lowering the molecular weight, lowering the concentration of hydroxyl groups in the polymer, lowering the fraction of acid in the polymer, using less reactive isocyanates and lowering the operating temperature. An improvement in the cohesion of the composition can be obtained in different ways. One way is to raise the crosslinker concentration, which reduces the processing time. With the crosslinker concentration constant, it is also possible to raise the molecular weight of the polyacrylate, which is possibly more efficient. The abovementioned parameters must be adapted appropriately in accordance with the desired profile of requirements of the composition and/or the product.

The polyacrylate to be prepared by the process of the invention is used in particular as a pressure-sensitive adhesive, in particular as a pressure-sensitive adhesive for an adhesive tape, where the acrylate pressure-sensitive adhesive is present in the form of a single- or double-sided film layer on a backing film. Moreover, the polyacrylate can be used as a viscoelastic backing for single-sidedly or double-sidedly adhesive-coated adhesive tapes. In that case the viscoelastic backing primarily forms the middle layer of adhesive tapes of three-layer construction.

This process is also especially suitable for producing three-dimensional shaped structures with or without PSA properties. A particular advantage of this process is that there is no limit on the coat thickness of the polyacrylate to be crosslinked and shapingly applied, in contrast to UV and EBC curing processes. In accordance with the choice of the coating or shaping application apparatus, therefore, it is possible to produce structures of any desired shape which are then able to aftercrosslink to a desired strength under mild conditions.

This process is also particularly suitable for the production of particularly thick layers, especially PSA layers or viscoelastic acrylate layers with a thickness of more than 80 μm. Layers of this kind are difficult to produce using the solvent technology (blistering, very slow coating speed, lamination of thin layers atop one another is awkward and features weak points).

Thick PSA layers may be present in unfilled form, as pure acrylate, or in resin-blended form or in a form filled with organic or inorganic fillers. Layers foamed in open-cell or closed-cell form by the known methods are also possible. One possible method of foaming is that using compressed gases such as nitrogen or $CO_2$, or foaming via expandants such as hydrazine or expandable microballoons. Where expanding microballoons are used, the composition or the shaped layer is advantageously activated in a suitable way by means of introduction of heat. Foaming may take place in the extruder or after the coating operation. It can be advantageous to make the foamed layers smooth using suitable rolls or release films. To produce foaming-analogous layers it is possible as well to add hollow glass beads or pre-expanded polymeric microballoons to the thermally crosslinked acrylate hotmelt PSA.

In particular it is possible with this process as well to produce thick layers which can be used as the backing layer on double-sidedly PSA coated adhesive tapes; more preferably, filled and foamed layers, which can be utilized as backing layers for foamlike adhesive tapes. With these layers as well it is sensible to add solid glass beads, hollow glass beads or expanding microballoons to the polyacrylate before the thermal crosslinker is added. Where expanding microballoons are used, the composition or the shaped layer is activated in a suitable way by means of introduction of heat. Foaming may take place in the extruder or after the coating operation. It can be advantageous to carry out smoothing of the foamed layer by means of suitable rolls or release films, or by lamination with a PSA which has been coated onto a release material. A foamlike, viscoelastic layer of this kind can be laminated on at least one side with a PSA layer. It is preferred to carry out lamination on both sides with a corona-pretreated polyacrylate layer. It is possible, alternatively, to carry out lamination with differently pretreated adhesive layers, i.e., PSA layers and/or heat-activatable layers based on polymers other than on an acrylate basis, to the viscoelastic layer. Suitable base polymers are adhesives based on natural rubber, synthetic rubbers, acrylate block copolymers, styrene block copolymers, EVA, certain polyolefins, special polyurethanes, polyvinyl ethers, and silicones. Preference is given, however, to compositions which have no notable fraction of migratable constituents which are so compatible with the polyacrylate that they diffuse in significant amount into the acrylate layer and alter the properties therein.

Instead of carrying out lamination with a PSA layer on both sides, it is also possible to use at least on one side a hotmelt adhesive layer or thermally activatable adhesive layer. Asymmetric adhesive tapes of this kind allow the bonding of critical substrates with a high bond strength.

Where the thermally crosslinked acrylate hotmelt layer is used as a viscoelastic backing layer, the glass transition range of the polyacrylate can also be situated above +25° C. Depending on the fraction of hardening comonomers such as tert-butyl acrylate, isobornyl acrylate or styrene, for example, a $T_g$ of up to 80° C. is possible.

A particular advantage of the thermally crosslinked acrylate hotmelt layer is that these layers, whether used as a viscoelastic backing or as a pressure-sensitive adhesive, have the same surface quality as UV-crosslinked and EBC-crosslinked layers but without a profile in crosslinking through the layer. As a result it is possible to exert ideal control and set on the balance between adhesive and cohesive properties for the entire layer by virtue of the crosslinking. In the case of radiation-crosslinked layers, one side or one sublayer is always over- or undercrosslinked.

Further suitable fillers for a thermally crosslinked acrylate hotmelt layer which is used as a viscoelastic backing are hydrophilic or hydrophobic silica gels such as Aerosils or Ultrasils, inorganic fillers such as chalk, titanium dioxide, calcium sulfate and barium sulfate, and also organic fillers such as polymer beads or fibers based on cellulose, polyethylene, polypropylene, polyamide, polyacrylonitrile, polyester, polymethacrylate and/or polyacrylate.

As further hardening comonomers it is also possible for macromonomers to have been incorporated by copolymerization into the polyacrylate. Particularly suitable macromonomers are those as described in EP 1361260 B1, an example being 2-polystyrene-ethyl methacrylate with a molecular weight Mw of 13 000 g/mol. These macromonomer-modified thermally crosslinked acrylate hotmelts can be used as a PSA or else as a viscoelastic backing.

For certain applications the adhesive tape of the invention, which in that case is in the form of an intermediate product, can be adapted further to requirements, and/or improved, by means of additional irradiation with actinic radiation (UV light or electron beams, for example).

Examples

The exemplary experiments which follow are intended to illustrate the invention without the choice of the examples given being intended to restrict the invention unnecessarily.
Test Methods:
Solids Content The solids content is a measure of the fraction of non-volatiles in a polymer solution. It is determined gravimetrically by weighing the solution, then evaporating the volatile fractions in a drying cabinet at 120° C. for 2 hours, and weighing the residue again.
K Value (According to FIKENTSCHER):

The K value is a measure of the average size of molecules of high polymer compounds. It is measured by preparing one percent (1 g/100 ml) solutions of polymer in toluene and determining their kinematic viscosities using a VOGEL-OSSAG viscometer. Standardizing for the viscosity of the toluene gives the relative viscosity, from which the K value can be calculated by the method of Fikentscher (Polymer 8/1967, 381 ff.).
Gel Permeation Chromatography GPC The average molecular weight $M_w$ and the polydispersity PD were determined by the company Polymer Standards Service, Mainz, Germany. The eluent used was THF containing 0.1% by volume trifluoroacetic acid. Measurement was made at 25° C. The precolumn used was PSS-SDV, 5μ, $10^3$ Å, ID 8.0 mm×50 mm. Separation was carried out using the columns PSS-SDV, 5μ, $10^3$ and also $10^5$ and $10^6$ each of ID 8.0 mm×300 mm. Sample concentration was 4 g/l, the flow rate 1.0 ml per minute. Measurement was made against PMMA standards.
180° Bond Strength Test A 20 mm wide strip of an acrylate PSA coated onto polyester was applied to steel plates. The PSA strip was pressed onto the substrate twice using a 2 kg weight. The adhesive tape was then immediately peeled from the substrate at 300 mm/min and an angle of 180°. The steel plates were washed twice with acetone and once with isopropanol. The results are reported in N/cm and are averaged from three measurements. All measurements were conducted at room temperature. The bond strength on polyethylene (PE) was determined analogously.

Shear Stability Time (Holding Power)

A strip of the adhesive tape, 13 mm wide, was applied to a smooth steel surface cleaned three times with acetone and once with isopropanol. The area of application was 20 mm*13 mm (length*width). Subsequently, with an applied pressure of 2 kg, the adhesive tape was pressed four times onto the steel support. At room temperature a 1 kg weight was fixed to the adhesive tape. The measured shear stability times are reported in minutes and correspond to the average of three measurements. Measurement is carried out under standard conditions (23° C., 55% atmospheric humidity) and at 70° C. in a heat cabinet.

SAFT—Shear Adhesive Failure Temperature

This test serves for accelerated testing of the shear strength of adhesive tapes under temperature load.

Sample preparation. The adhesive tape sample (PSA coated onto 50 µm PET film) is adhered to a steel test plate, sanded and cleaned with acetone, and is subsequently rolled on six times using a 2 kg steel roller and a speed of 10 m/min. The bond area of the sample is, in terms of height×width, 13 mm×10 mm; the sample is suspended vertically, protrudes beyond the top edge of the steel test plate by 2 mm, and is reinforced flush with a stable adhesive strip which serves as a support for the travel sensor.

Measurement: The sample for measurement is loaded at the bottom end with a weight of 50 g. The steel test plate with the bonded sample is heated, starting at 25° C. at a rate of 9° C. per minute, to the end temperature of 200° C. Using the travel sensor, the slip travel of the sample is measured as a function of temperature and time. The maximum slip travel is set at 1000 µm; if it is exceeded, the test is discontinued. Testing conditions: room temperature 23±3° C., relative atmospheric humidity 50±5%.

Positive Test Result:
  Slip travel on reaching the end temperature (200° C.), reported in µm.
Negative Test Result:
  Temperature on reaching maximum slip travel (1000 µm), reported in ° C.

Preparation of the Starting Polymers for Examples 1 to 9

The preparation of the starting polymers is described below. The polymers investigated are prepared conventionally by free radical polymerization in solution.
HEMA=hydroxyethyl methacrylate
AIBN=2,2'-azobis(2-methylbutyronitrile)
Perkadox 16=bis(4-t-butylcyclohexyl) peroxydicarbonate Base Polymer P1

A reactor conventional for radical polymerizations was charged with 27 kg of 2-ethylhexyl acrylate, 27 kg of n-butyl acrylate, 4.8 kg of methyl acrylate, 0.6 kg of acrylic acid, 0.6 kg of HEMA and 40 kg of acetone/isopropanol (90:10). After nitrogen gas had been passed through the reactor for 45 minutes with stirring the reactor was heated to 58° C. and 30 g of AIBN were added. Subsequently, the external heating bath was heated to 75° C. and the reaction was carried out constantly at this external temperature. After 1 h a further 30 g of AIBN were added and after 4 h the batch was diluted with 10 kg of acetone/isopropanol mixture.

After 5 h and after 7 h, reinitiation was carried out with 90 g of Perkadox 16 on each occasion. After a reaction time of 22 h the polymerization was discontinued and the product cooled to room temperature. The polyacrylate has a K value of 62, a solids content of 54.6%, an average molecular weight of $M_w$=605 000 g/mol, polydispersity ($M_w/M_n$)=8.6.

Base Polymer P2

In the same way as in example B1, 26.1 kg of 2-ethylhexyl acrylate, 26.1 kg of n-butyl acrylate, 4.8 kg of methyl acrylate, 1.8 kg of acrylic acid and 1.2 kg of HEMA were polymerized in 40 kg of acetone/isopropanol (90:10). Initiation was carried out twice with 30 g of AIBN on each occasion, and twice with 90 g of Perkadox 16 on each occasion, and the batch was diluted with 10 kg of acetone/isopropanol mixture (90:10). After a reaction time of 22 h the polymerization was discontinued and the product cooled to room temperature.

The polyacrylate has a K value of 58, a solids content of 54.8%, an average molecular weight of $M_w$=583 000 g/mol, polydispersity ($M_w/M_n$)=7.8.

Base Polymer P3

In the same way as in example B1, 26.4 kg of 2-ethylhexyl acrylate, 26.7 kg of n-butyl acrylate, 4.8 kg of methyl acrylate, 1.8 kg of acrylic acid and 0.3 kg of HEMA were polymerized in 40 kg of acetone/isopropanol (95:5). Initiation was carried out twice with 30 g of AIBN on each occasion, and twice with 90 g of Perkadox 16 on each occasion, and the batch was diluted with 10 kg of acetone/isopropanol mixture (95:5). After a reaction time of 22 h the polymerization was discontinued and the product cooled to room temperature.

The polyacrylate has a K value of 72.5, a solids content of 53.5%, an average molecular weight of $M_w$=702 000 g/mol, polydispersity ($M_w/M_n$)=7.3.

Base Polymer P4

In the same way as in example B1, 44.0 kg of 2-ethylhexyl acrylate, 44.0 kg of n-butyl acrylate, 10 kg of methyl acrylate and 2 kg of HEMA were polymerized in 66.66 kg of acetone/isopropanol (95:5).

The polyacrylate has a K value of 80, a solids content of 55.0%, an average molecular weight of $M_w$=890 000 g/mol, polydispersity ($M_w/M_n$)=8.2.

Base Polymer P5

The procedure was the same as in example B1. For the polymerization, 27 kg of 2-ethylhexyl acrylate, 27.0 kg of n-butyl acrylate, 4.8 kg of methyl acrylate, 0.6 g of acrylic acid and 0.6 kg of HEMA were polymerized in 40 kg of acetone/isopropanol (92.5:7.5). Initiation was carried out twice with 30 g of AIBN on each occasion, and twice with 90 g of Perkadox 16 on each occasion, and the batch was diluted with 10 kg of acetone/isopropanol mixture (92.5:7.5). After a reaction time of 22 h the polymerization was discontinued and the product cooled to room temperature. The polyacrylate has a K value of 68, a solids content of 54.6%, and an average molecular weight of $M_w$=681 000 g/mol, polydispersity ($M_w/M_n$)=8.6.

Base Polymer P6

A reactor conventional for radical polymerizations was charged with 27 kg of 2-ethylhexyl acrylate, 27 kg of n-butyl acrylate, 4.8 kg of methyl acrylate, 0.6 kg of acrylic acid, 0.6 kg of HEMA, 40 g of benzyl dithiobenzoate and 40 kg of acetone. After nitrogen gas had been passed through the reactor for 45 minutes with stirring the reactor was heated to 58° C. and 30 g of AIBN were added. Subsequently, the external heating bath was heated to 75° C. and the reaction was carried out constantly at this external temperature. After 1 h a further 30 g of AIBN were added. After 4 h the batch was diluted with 5 kg of acetone. After 5 h and after 7 h, Perkadox 16™ (from Akzo) was added, 90 g on each occasion. After a reaction time of 22 h the polymerization was discontinued and the product cooled to room temperature.

The polyacrylate has a K value of 52, a solids content of 55.2%, and an average molecular weight of $M_w$=462 000 g/mol, polydispersity $(M_w/M_n)$=2.8.

Method 1: Concentration/Preparation of Hotmelt PSA:

The acrylate copolymers functionalized with hydroxyl groups (base polymers P1 to P6) are freed very substantially from solvent by means of a BERSTORFF single-screw extruder (concentration extruder). The concentration parameters are exemplified here with reference to base polymer P1. The speed of the screw was 170 rpm, the motor current 17 A, and a throughput of 62.3 kg liquid/h was realized. For concentration a vacuum was applied at 3 different domes. The underpressures were 340 mbar, 50 mbar and 7 mbar respectively, with the lowest vacuum being applied in the first dome. The exit temperature of the concentrated hotmelt was 105° C. The solids content after this concentration step was 99.7%.

Method 2: Preparation of Resin-Modified Hotmelt PSAs

The acrylate hotmelt PSAs prepared by method 1 set out above were conveyed directly into a downstream WELDING twin-screw extruder (WELDING Engineers, Orlando, USA; model 30 mM DWD; screw diameter 30 mm, length of screw 1=1258 mm; length of screw 2=1081 mm; 3 zones). A solids metering system was used to meter 30% by weight of the resin Dertophene T110 (manufactured by DRT, France) into zone 1, and it was mixed in homogeneously. The parameters for resin compounding are exemplified here by reference to base polymer 1. The speed was 474 rpm, the motor current 44 A, and a throughput of 31.3 kg/h was realized. The temperatures of zones 1 and 2 were each 100° C., the melt temperature in zone 1 112° C. and the temperature of the composition on exit (zone 3) 90° C.

Method 3: Production of the Inventive Adhesive Tapes, Blending with the Thermal Crosslinker and Coating (Examples 1 to 9)

The acrylate hotmelt PSAs prepared in accordance with methods 1-2 were melted in a feeder extruder (single-screw conveying extruder from TROESTER) and conveyed therewith as a polymer melt into a twin-screw extruder (LEISTRITZ, Germany, ref. LSM 30/34). The apparatus is electrically heated from outside and air-cooled by a variety of fans, and is designed so that effective distribution of the crosslinking system in the polymer matrix is accompanied by the assurance of a short residence time of the adhesive in the extruder. For this purpose the mixing screws of the twin-screw extruder were arranged so that conveying elements are in alternation with mixing elements. The respective crosslinking systems are added by means of suitable metering equipment, at two or more sites where appropriate, and using metering aids where appropriate, into the unpressurized conveying zones of the twin-screw extruder.

After the ready-compounded adhesive, blended with crosslinker, has emerged from the twin-screw extruder (through a round die 5 mm in diameter) it is coated directly, by means of a downstream 2-roll applicator, onto a 50 μm polyester film by the coating method of version A (FIG. 2). As mentioned above, the time between the metered addition of the crosslinking system and the visually homogeneous shaping application to a backing is referred to as the processing time. The processing time is heavily dependent on operating temperature, type and amount of crosslinker, and on the functionalization of the acrylate composition with carboxyl and hydroxyl groups, and indicates the period of time within which the adhesive, blended with crosslinker, can be coated with a visually good coat pattern (gel-free, speck-free). Coating takes place with web speeds of between 1 m/min and 20 m/min; the doctor roll of the 2-roll applicator is not driven.

In the examples below and in table 1 the operating conditions, metering proportions and formulations are elucidated in greater detail.

Example B1

Base polymer P1 was concentrated by method 1 (solids content: 99.7%) and then blended by method 3 with 30% of Dertophene T 110 resin. This resin-modified acrylate hotmelt was blended by method 4 with 0.25% by weight (based on acrylate copolymer) of the trimerized aliphatic diisocyanate Desmodur XP 2410 (Bayer AG, Germany). To improve its meterability the trimerized diisocyanate was diluted in a ratio of 1 to 3 with the liquid phosphate ester REOFOS 65 (from Great Lakes, USA). The operating parameters are summarized in table 1. The processing time of the compound was 9 minutes at an effective composition temperature of 82° C. after exiting the LEISTRITZ extruder. Coating takes place on a 2-roll applicator at roll temperatures of 100° C. and an application rate of 85 g/m² onto PET film. SAFT measurements were carried out on the adhesive tape thus produced, as a function of the storage time of the specimens at room temperature. After 5 days of room-temperature storage the crosslinking of the specimens is complete, with the SAFT slip travel reaching a stable level at about 540 μm. The results are shown graphically in FIG. 8. Further technical adhesive data for example 1 are summarized in table 2.

Example B2

Base polymer P1, concentrated by method 1 and blended by method 2 with 30% of Dertophene T110 resin, was blended with crosslinker and coated, in the same way as in example B1. It was admixed with 0.45% by weight (based on acrylate copolymer) of the trimerized HDI polyisocyanate Desmodur N3600 (Bayer AG, Germany) by method 3. The speed of the LEISTRITZ twin-screw extruder was 50 revolutions per minute, the throughput 13.0 kg/h. The processing time was 7 min for an effective composition temperature of 85° C. after exiting the extruder. Using a roll applicator, coating took place at an application rate of 105 g/m² onto 23 μm PET film. SAFT measurements were carried out on the adhesive tape thus produced, as a function of the storage period of the specimens at room temperature. After 5 days of room-temperature storage the crosslinking of the specimen is virtually complete and the SAFT slip travel reaches a stable level at about 540 μm. After 5 days of room-temperature storage the crosslinking is complete and the SAFT slip travel reaches a plateau (FIG. 9). For technical adhesive data see example B2 in table 2.

Example B3

Base polymer P2, concentrated by method 1 and blended by method 2 with 30% of Dertophene T110 resin, was blended with crosslinker and coated, in the same way as in example B1. Using method 3, 0.25% by weight (solids on solids, based on the acrylate copolymer) of an aqueous suspension (solids content: 34%) of the micronized IPDI trimer superficially deactivated with diisopropylamine, HF9 (Bayer AG, Germany) was added to the acrylate hotmelt. For operating conditions see table 1. Subsequently it was coated on a roll applicator onto 23 μm PET film, with an application rate of 77 g/m². The processing time was 6 min for an effective composition temperature of 78° C. on exiting the compounding extruder. The shear stability time of the adhesive tape thus produced was measured under standard conditions (23° C., 55% atmospheric humidity) as a function of the storage period at room temperature. The shear test values climb within the first 10 days to about 2500 min and then remain at that level over the entire observation period of 270 days. The results are shown graphically in FIG. 10. For further technical adhesive data see example B3 in table 2.

Example B4

In the same way as in example B1, base polymer P1 was concentrated by method 1, blended by method 2 with 30% by weight of DT 110 and blended by method 3 with 0.39% by weight of Desmodur XP 2410, and coated at an application rate of 65 g/m$^2$ onto 23 μm PET film. The operating conditions are shown in table 1. For technical adhesive data see example B4 in table 2.

Example B5

In the same way as in example B1, base polymer P3 was concentrated by method 1, blended by method 2 with 30% by weight of DT 110 and blended by method 3 with 0.40% by weight of Desmodur XP 2410, and coated at an application rate of 85 g/m$^2$ onto 23 μm PET film. The operating conditions are shown in table 1. For technical adhesive data see example B5 in table 2.

Example 6

In the same way as in example B1, base polymer P3 was concentrated by method 1 and without addition of resins or fillers was blended by method 3 with 0.20% by weight of Desmodur XP 2410, and coated at an application rate of 90 g/m$^2$ onto 23 μm PET film. The operating conditions are shown in table 1. For technical adhesive data see example B6 in table 2.

Example 7

In the same way as in example B1, base polymer P4 was concentrated by method 1 and without addition of resins or fillers was blended by method 3 with 0.40% by weight of Desmodur XP 2410, and coated at an application rate of 100 g/m$^2$ onto 23 μm PET film. The operating conditions are shown in table 1. For technical adhesive data see example B7 in table 2.

Example 8

In the same way as in example B1, base polymer P5 was concentrated by method 1 and conveyed into a WELDING twin-screw extruder (WELDING Engineers, Orlando, USA).

Solids metering systems were used to meter in 30% by weight of Dertophene T110 resin and 30% by weight of Mikrosöhl chalk (MS 40, Söhlde) in zone 1, and the batch was subsequently homogenized. Shearing was increased by installation of two holdup elements. The parameters set were as follows: speed 460 rpm, motor current 58 A, throughput of polymer 40.0 kg/h, zone 1 temperature=110° C., zone 2 temperature=100° C., melt temperature in zone 1=154° C., composition temperature on exit (zone 3) 134° C. 0.40% by weight of Desmodur XP2410 was mixed into this composition by method 3, and the resulting material was coated onto 23 μm PET film by means of a 2-roll method at 85 g/m$^2$. The operating conditions are shown in table 1. For technical adhesive data see example B8 in table 2.

Example 9

In the same way as in example B1, base polymer P6 was concentrated by method 1, blended by method 2 with 30% by weight of DT 110 and blended by method 3 with 0.50% by weight of Desmodur XP 2410, and coated at an application rate of 100 g/m$^2$ onto 23 μm PET film. The operating conditions are shown in table 1. For technical adhesive data see example B9 in table 2.

The process of the invention surprisingly offers an outstanding achievement of the object stated at the outset. Thus it is possible, by minimizing the processing pathway—addition of the crosslinker in the extruder, during effective mixing of the composition in the course of actual transport to the coating unit, and then, immediately thereafter, an optimized mode of coating, in particular by virtue of the calenders presented—to produce pressure-sensitive acrylate hotmelt adhesives which lend themselves well to coating and whose applied coatings are very uniform and homogeneous. As a result of the advantageous thermal crosslinking, which with advantage takes place directly on the backing material, it is possible, furthermore, to offer layers which exhibit no profile in crosslinking through the thickness of the layer. With no other composition containing a thermal crosslinker has it been possible hitherto to ascertain such positive processing properties, and no other, prior-art compositions suggested such good processing properties when varying the crosslinker.

Completely surprising to the skilled person is the coatability of the hotmelt adhesive following addition and incorporation of the isocyanate crosslinking system into the polyacrylate adhesive at the temperatures of between 60° C. and 120° C. prevailing in the compounding apparatus, preferably between 70° C. and 100° C. By coatability in this context is meant the suitability for shaping of the adhesive, blended with crosslinker, into thin coats and for application to a web-form backing material by means of coating die or roll coating mechanism.

The expected outcome was crosslinking or gelling of the adhesive, so that subsequent coating would no longer have been possible. In actual fact, however, it is possible for the adhesives described to be coated within a certain period of time after addition of crosslinker and compounding. The processing time is heavily dependent on the molecular weight and hydroxy functionalization of the polyacrylate adhesive, and also on the type and amount of the crosslinking system used, and the prevailing operating conditions, such as composition temperature, for example, and geometric characteristics of the compounding assembly.

In accordance with the known state of the art the skilled person would have expected immediate reaction between the isocyanates and the OH groups present in the polyacrylate, with the resultant, partially crosslinked composition being uncoatable. In order to avoid this the skilled person would have had to have used blocked isocyanates in conjunction with extremely high temperatures, with the disadvantage of the disruptive blocking agents remaining in the adhesive.

Likewise impossible to expect for the skilled person was the possibility of effective aftercrosslinking of the adhesives at room temperature without controlled influence of actinic radiation; this possibility is demonstrated significantly by the SAFT and SST steel 10 N.

As is apparent from the data in table 2, adhesives with very high performance can be produced by this process. The adhesion values are very good, particularly for the resin-modified compositions, and the cohesion—measured by the shear stability times at 23° C. and 70° C.—is likewise good. Surprisingly good to the skilled person is the thermal stability, measured by the SAFT test. In each case the adhesive bond is stable up to a temperature of 200° C.

The advantages of the process of the invention can be illustrated comprehensively by means of a time profile, as depicted in FIG. 7 (graphic representation: degree of crosslinking ρ against time t):
- a composition which is not crosslinked during coating and which can be coated with a homogeneous coat pattern (region [1], characterized by the processing time $t_T$, in other words the time between addition of crosslinker and coating),
- a sufficient crosslinking (proceeding by itself) of the composition within a few days to reach a degree of crosslinking ($ρ_{targ}$) which guarantees that the product satisfies the temperature stability requirements imposed by the fields of application of the PSA (region [2] characterized by the maturation time $t_R$, i.e. the time between coating and the attainment of the desired degree of crosslinking ($ρ_{targ}$),
- automatic ending of the crosslinking reaction on attaining the desired degree of crosslinking $ρ_{targ}$, so that overcrosslinking of the adhesive does not occur (region [3]).

$t_0$ denotes the time of crosslinker addition, $t_B$ the time of coating.

The process of the invention makes it possible for the first time to avoid the disadvantages of the state of the art.

The adhesive tape of the invention can be used advantageously as a strippable adhesive tape as well, in particular such that by pulling substantially in the plane of the adhesive bond it can be detached again without residue.

TABLE 1

The principal parameters of incorporation of the crosslinker into the AC hotmelt PSA by method 3, production of specimens

| | Compounding | | Crosslinker incorporation and coating by method 3 | | | |
|---|---|---|---|---|---|---|
| | Base polymer | method 2 Fraction of | Crosslinker type and amount [% | Throughput | Speed | Setpoint |
| Example | Polymer | K value | adjuvants [wt. %] | crosslinker based on polymer] | TSE [kg/h] | TSE [1/min] | temperature TSE [° C.] |
| B1 | P1 | 62 | 30% DT110 | 0.25% Desmodur XP2410 | 12.5 | 50 | 80 |
| B2 | P1 | 62 | 30% DT110 | 0.45% Desmodur N3600 | 13.0 | 50 | 80 |
| B3 | P2 | 58 | 30% DT110 | 0.25% HF9 | 12 | 50 | 50 |
| B4 | P1 | 62 | 30% DT110 | 0.39% Desmodur XP2410 | 12.5 | 50 | 80 |
| B5 | P3 | 72.5 | 30% DT110 | 0.40% Desmodur XP2410 | 12.0 | 100 | 80 |
| B6 | P3 | 72.5 | — | 0.20% Desmodur XP2410 | 10.0 | 100 | 100 |
| B7 | P4 | 80 | — | 0.40% Desmodur XP2410 | 12.5 | 100 | 70 |
| B8 | P5 | 68 | 30% DT110 and 30% Mikrosöhl | 0.40% Desmodur XP2410 | 13.0 | 150 | 70 |
| B9 | P6 | 52 | 30% DT110 | 0.5% Desmodur XP2410 | 14 | 100 | 70 |

| | Crosslinker incorporation and coating by method 3 | | | | | |
|---|---|---|---|---|---|---|
| Example | Current consumption TSE [A] | Exit pressure TSE [bar] | Composition temperature after TSE [° C.] | Coating temperature doctor blade roll/coating roll [° C.] | Processing time [min] | Application rate [g/m²] |
| B1 | 8.5 | 13 | 82 | 100/100 | 9 | 85 |
| B2 | 8.5 | 14 | 85 | 100/80 | 7 | 105 |
| B3 | 14.5 | 27 | 78 | 100/100 | 6 | 77 |
| B4 | 8.5 | 14 | 83 | 100/80 | 9 | 65 |
| B5 | 15.0 | 30 | 98 | 100/100 | 5 | 85 |
| B6 | 18.0 | 35 | 107 | 100/100 | 3 | 90 |
| B7 | 14 | 20 | 86 | 100/100 | 10 | 100 |

TABLE 1-continued

The principal parameters of incorporation of the crosslinker
into the AC hotmelt PSA by method 3, production of specimens

| | | | | | | |
|---|---|---|---|---|---|---|
| B8 | 12.5 | 15 | 103 | 100/100 | 8 | 85 |
| B9 | 11.5 | 11 | 83 | 100/100 | 20 | 100 |

TSE = twin-screw extruder

TABLE 2

The principal technical adhesive properties of examples 1-9

| Example | | Composition (base polymer, adjuvants, crosslinker) | | Backing | Application rate [g/m²] | Bond strength steel [N/cm] | Bond strength PE [N/cm] | Shear stability time 10 N 23° C. [min] | Shear stability time 10 N 70° C. [min] | SAFT test |
|---|---|---|---|---|---|---|---|---|---|---|
| B1 | P1 | 30% DT110 | 0.25% Desmodur XP2410 | 23 μm polyester film | 85 | 10.8 | 6.0 | 1203 | 21 | 582 μm (200° C.) |
| B2 | P1 | 30% DT110 | 0.45% Desmodur N3600 | 23 μm polyester film | 105 | 11.4 | 6.2 | 1450 | 15 | 723 μm (200° C.) |
| B3 | P2 | 30% DT110 | 0.25% HF9 | 23 μm polyester film | 77 | 9.2 | 4.0 | 5822 | 104 | 384 μm (200° C.) |
| B4 | P1 | 30% DT110 | 0.39% Desmodur XP2410 | 23 μm polyester film | 65 | 8.2 | 3.9 | 1850 | 20 | 425 μm (200° C.) |
| B5 | P3 | 30% DT110 | 0.40% Desmodur XP2410 | 23 μm polyester film | 85 | 8.5 | 4.2 | 10 000 | 200 | 290 μm (200° C.) |
| B6 | P3 | — | 0.20% Desmodur XP2410 | 23 μm polyester film | 90 | 6.3 | 1.8 | 10 000 | 500 | 80 μm (200° C.) |
| B7 | P4 | — | 0.40% Desmodur XP2410 | 23 μm polyester film | 100 | 5.8 | 2.5 | 3000 | 30 | 140 μm (200° C.) |
| B8 | P5 | 30% DT110 and 30% Mikrosöhl | 0.40% Desmodur XP2410 | 23 μm polyester film | 85 | 11.5 | 6.8 | 2000 | 25 | 610 μm (200° C.) |
| B9 | P6 | 30% DT110 | 0.5% Desmodur XP2410 | 23 μm polyester film | 100 | 12.0 | 5.8 | 2500 | 40 | 560 μm (200° C.) |

The tests were conducted 10 days after storage at 23° C., 55% atmospheric humidity.

The invention claimed is:

1. A process for producing an adhesive tape with single- or double-sided crosslinked pressure-sensitive acrylate hotmelt adhesive layer, wherein a trimerized isocyanate crosslinker is added in the melt to a polyacrylate copolymer based on acrylic and/or methacrylic esters, the polyacrylate with crosslinker is conveyed to a coating unit, where it is applied to a web-form layer and following application is homogeneously crosslinked, wherein the crosslinker is a thermal crosslinker and some of the acrylic and/or methacrylic esters contain primary hydroxyl groups.

2. The process of claim 1, the trimerized isocyanate crosslinker is added in an extruder.

3. The process of claim 1, wherein said web-form layer is a backing material.

4. The process of claim 1, wherein said web-form layer is a crosslinked adhesive.

5. The process of claim 1, wherein said trimerized isocyanate is an aliphatic isocyanate or an isocyanate deactivated with amines.

6. The process of claim 1 wherein the temperature of the polyacrylate when the trimerized isocyanate is added is between 60° C. and 120° C.

7. The process of claim 1, wherein the residual monomer content in the polyacrylate when the crosslinker is added is not more than 1% by weight, based on the polymer.

8. The process of claim 1, wherein the fraction of the acrylic and/or methacrylic esters containing primary hydroxyl groups is up to 25% by weight, based on the polyacrylate.

9. The process of claim 1, wherein the coating unit is a multiroll coating calender having two to four rolls.

10. The process of claim 8, wherein at least one of the rolls is provided with an anti-adhesively finished roll surface.

11. The process of claim 10, wherein the anti-adhesively finished roll surface consists of a steel-ceramic-silicone composite.

12. The process of claim 1, wherein the polyacrylate is the product of the following mixture of reactants:

a1) 65 to 99% by weight acrylic and/or methacrylic esters of the general formula

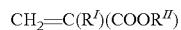

where $R^I$=H or $CH_3$ and
$R^{II}$=alkyl chain having 1 to 20 carbon atoms, a2) 1% to 20% by weight acrylates and/or methacrylates whose alcohol component contains at least one primary hydroxyl group, and/or vinyl compounds which are copolymerizable with acrylates and contain at least one primary hydroxyl group, with a fraction of 1% to 20% by weight, and a3) and, if the fractions of a1) and a2) do not add up to 100% by weight, 0% to 15% by weight olefinically unsaturated copolymerizable monomers containing functional groups,
with a fraction of 0% to 15% by weight.

13. The process of claim 6, wherein said temperature is between 70° C. and 100° C.

* * * * *